[11] 3,628,859

[72] Inventor Edwin Zucker
 Rochester, N.Y.
[21] Appl. No. 887,452
[22] Filed Dec. 22, 1969
[45] Patented Dec. 21, 1971
[73] Assignee Xerox Corporation
 Rochester, N.Y.

[54] IMAGING MACHINE IMPROVEMENT
 8 Claims, 7 Drawing Figs.
[52] U.S. Cl. .................................................. 355/8,
 355/46, 355/49
[51] Int. Cl. ........................................ G03g 15/00,
 G03b 27/50, G03b 27/70
[50] Field of Search ........................................... 355/3, 8,
 46, 49

[56] References Cited
 UNITED STATES PATENTS
 3,040,619 6/1962 Oxberry ........................ 355/46
 3,519,344 7/1970 Clark et al. .................... 355/46 X
 3,523,725 8/1970 Schaeffer ....................... 355/8

Primary Examiner—Samuel S. Matthews
Assistant Examiner—Richard A. Wintercorn
Attorneys—James J. Ralabate, David C. Petre and Barry Jay Kesselman ABSTRACT: Method and apparatus for forming registration errors in multiple slit scanning optical systems by repositioning the lens of the system in a plane perpendicular to its axis to shift the projection in the image plane. By shifting the optical systems to eliminate or bias a registration error between multiple slit scan optical systems, a minimization of slit errors are accomplished.

IMAGING MACHINE IMPROVEMENT

This invention relates to multiple exposure techniques and more particularly to registration error elimination.

Recently developed imaging techniques have increased the need for multiple reexposure of an image. A particular imaging system benefited by a multiple reexposure is one employing the process of photoelectrophoresis. The basic systems inventions are described in U.S. Pat. Nos. 3,383,993; 3,384,565 and 3,384,566. They disclose how to produce a visual image at one or both of two electrodes between which photoelectrophoretic particle suspensions are placed. The particles are photosensitive and appear to undergo a net change in charge polarity or a polarity alteration by interaction with one of the electrodes upon exposure to activating electromagnetic radiation. Mixtures of two or more differently colored particles can secure various colors of images. The particles will migrate from one of the electrodes under the influence of an electric field when struck with energy of a wavelength within the spectral response curve of the colored particles.

A continuous imaging machine was disclosed in U.S. Pat. No. 3,427,242 which depicts apparatus for forming continuous images from photoelectrophoretic suspensions by projection of an original utilizing a system for scanning an object and placing the image light rays through the transparent surface of the cylindrical electrode.

The practical image formation from the process disclosed above is enhanced in many cases by subjecting the photoelectrophoretic particles to imaging conditions more than once. By resubjecting the photoelectrophoretic imaging particle suspension to substantially the same image light pattern and an electric field more than once, the final image formed is enhanced by removal of particles from areas where there was insufficient illumination to previously cause migration of the particles from one electrode to another. If a machine such as disclosed in U.S. Pat. No. 3,427,242 were to attempt to enhance images by reexposure under imaging conditions a second time using the same projection system, it would require a second revolution of the image forming electrode in that machine. This would reduce the speed and efficiency of the machine by half or more depending upon the number of imaging passes determined best for full image enhancement.

Copending application Ser. No. 887,453 filed on Dec. 22, 1969 in the names of S. Hoffman, E. Jackson, G. Starkweather and E. Zucker discloses a multiple reexposure system for subjecting imaging materials to imagewise radiation a plurality of times during a single imaging pass. It is with systems such as this that the invention herein is especially effective by eliminating or reducing mechanical and optical errors in the reexposing optical systems. By use of this invention it is possible to improve the resolution capability of the apparatus utilizing multiple reexposure slit scanning optical systems.

Therefore, it is an object of this invention to improve optical apparatus. Another object of this invention is to improve resolution capabilities of multiple reexposure systems. Yet another object of this invention is to improve optical systems experiencing registration errors.

The invention herein is described and illustrated in a specific embodiment having specific components listed for carrying out the functions of the apparatus. Nevertheless, the invention need not be thought of as being confined to such a specific showing and should be construed broadly within the scope of the claims. Any and all equivalent structures known to those skilled in the art can be substituted for specific apparatus or steps disclosed as long as the substituted apparatus or steps achieve a similar function. It may be that other processes or apparatus will be invented having similar needs to those fulfilled by the apparatus and methods described and claimed herein. And it is the intention herein to describe an invention for use in apparatus other than the embodiment shown.

These and other objects and advantages of this invention will become apparent to those skilled in the art after reading the following description taken in conjunction with the accompanying drawings wherein:

FIGS. 4–7 illustrate resolution and registration errors at the image plane.

Figure 1:
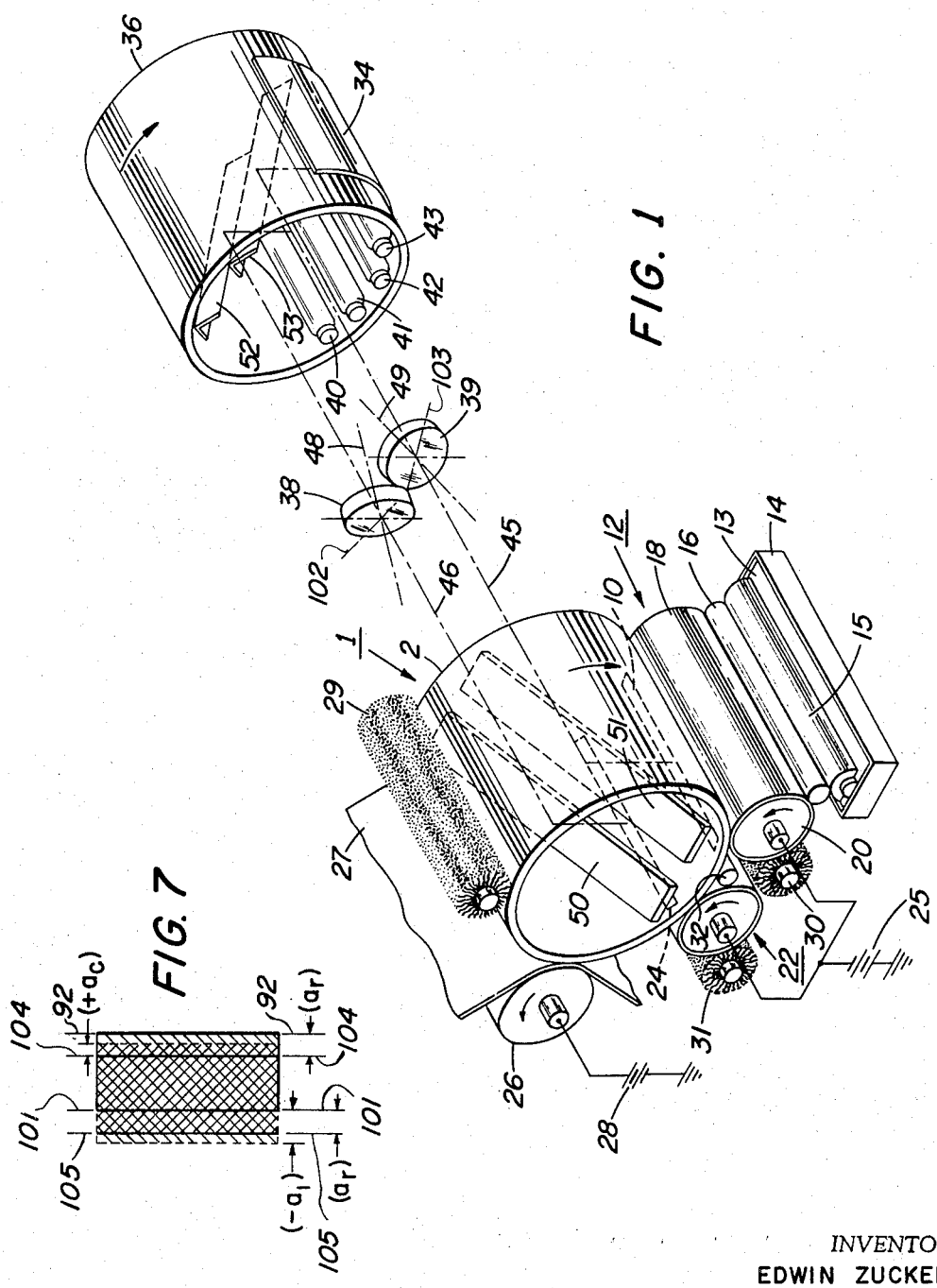
FIG. 1 is a schematic isometric representation of an embodiment of a machine for forming images.

There are certain terms of art used in conjunction with the photoelectrophoretic imaging process shown in the embodiment of FIG. 1 which should be defined. The "injecting electrode" is so named because it is thought to inject electrical charges into activated photosensitive particles during imaging. The term "photosensitive" for the purpose of this disclosure refers to the property of a particle which, once attracted to the injecting electrode, will alter its polarity and migrate away from the electrode under the influence of an applied electric field when exposed to activating electromagnetic radiation. The term "suspension" may be defined as a system having solid particles dispersed in a solid, liquid or gas. Nevertheless, the suspension used in the disclosure herein is of the general type having a solid suspended in a liquid carrier. The term "imaging electrode" is used to describe that electrode which interacts with the injecting electrode through the suspension and which once contacted by activated photosensitive particles will not inject sufficient charge into them to cause them to migrate from the imaging electrode surface. The injecting electrode is covered with a dielectric surface composed of a material having a volume resistivity preferably in the order of $10^7$ or greater ohm-cm, and a conductive core member which is preferably a resilient material such as electrically conductive rubber used to give flexibility to the imaging electrode.

For photoelectrophoretic imaging to occur it is thought that these steps, not necessarily listed in the sequence that they occur, take place: (1) migration of the particles toward the injecting electrode due to the influence of an electric field, (2) the generation of charge carriers within the particles when struck by activating radiation within their spectral response curve; (3) particle deposition on or near the injecting electrode surface; (4) phenomena associated with the forming of an electrical junction between the particles and the injecting electrode; (5) particle charge exchange with the injecting electrode; (6) electrophoretic migration toward the imaging electrode; (7) particle deposition on the imaging electrode. This leaves an optically positive image on the contacted surface of the injecting electrode.

The schematic representation of FIG. 1 shows a photoelectrophoretic imaging apparatus having an injecting electrode 1 with a coating 2 of transparent conductive material such as tin oxide on the outside surface of a transparent glass member. Such combination is commercially available under the name of NESA glass from Pittsburgh Plate Glass Company of Pittsburgh, Pa. However, other electrically conductive coatings over transparent substrates are suitable for use herein. At a first imaging area 10 an imaging electrode 12 interfaces with the outer surface of the injecting electrode 1. The imaging electrode carries imaging suspension 13 from the suspension supply housing 14 via a suspension application system having a metering roll 15 and an applicator roll 16. The imaging suspension is applied to the surface of the injecting electrode between the injecting electrode 1 and the imaging electrode 12 at the first imaging area 10.

The imaging electrode 12 has a high dielectric surface 18 overcoated on a conductive flexible inner core 20 which is preferably a resilient material of conductive rubber or the like. A second imaging electrode 22 interfaces with the outer surface of the injecting electrode 2 at a second imaging area 24. Both of the imaging electrodes are connected respectively to the negative terminal of an electrical source 25. The injecting electrode 1 is shown schematically connected to ground so that a field exists between the two imaging electrodes on the one hand and the injecting electrode on the other as is required for the photoelectrophoretic imaging process. Further, the second imaging electrode 22 has a sprayer 32 operatively associated with it to spray carrier material onto the surface of the second imaging roller 22. This aids in selectively removing particles of the suspension from the outer surface of the injecting electrode under imaging conditions provided by the optical system and the electrical source. It has been found that the addition of material similar to the liquid carrier of the imaging suspension aids in the migration of particles of the suspension away from the injecting electrode in the second imaging area 24.

Interfacing with the outer surface 2 of the injecting electrode 1 downstream or further along the path of movement of the injecting electrode is the transfer roller 26 and transfer support sheet 27. The transfer roller is electrically connected to a source 28 for causing an opposite polarity to the two imaging electrodes 20 and 22 with their electrical source. It is the function of the transfer electrode to electrophoretically transfer the imaging suspension from the surface 2 of the injecting electrode 1 to a support material which is used as the final image support media. A cleaning brush 29 is placed in contact with the outer surface of the injecting electrode 1 to remove any residual suspension left on the injecting electrode after transfer has been completed. Similarly, cleaning brushes 30 and 31 contact the imaging electrodes 12 and 22 respectively to clean their surfaces after they interface with the injecting electrode.

The integrated dual optical system shown herein presents superposed imagewise electromagnetic radiation at each of the plurality of imaging areas denoted by the numerals 10 and 24. The image is of continquous portions of the document 34 placed on the document drum 36 at the object plane of the plurality of the lenses 38 and 39. Radiation energy or illumination is supplied by light sources 40–43. The two reference lines 45 and 46 shown in FIG. 1 represent the principal ray from the object plane to the image plane of the optical system. It should be noted that the document 34 is maintained on a surface of the object drum 36 which passes through the object plane of each of the two lenses 38 and 39. The outer surface 2 of the injecting electrode 1 moves through the image plane of the two lenses at the imaging areas 10 and 24, respectively. The principal rays 45 and 46 shown are not the optical axes of each of the lenses. The optical axes in fact are shown by the reference lines 48 and 49.

Within the dual optical system are equal sets of mirrors including plane mirrors 50 and 51 and roof mirrors 52 and 53 shown in the respective optical paths of the two lenses 38 and 39.

Although only two optical systems are shown it is possible for three or more to be coordinated in the manner of this invention to permit multiple imaging passes with a single revolution of the injecting electrode past a plurality of imaging electrodes equal to the number of coordinated optical systems. The optical systems function to present multiple exposures of the document from various places of the object drum to various preselected places of the injecting electrode so that the same portions of the document are projected at each of the various prepositions on the injecting electrode.

Figure 2:
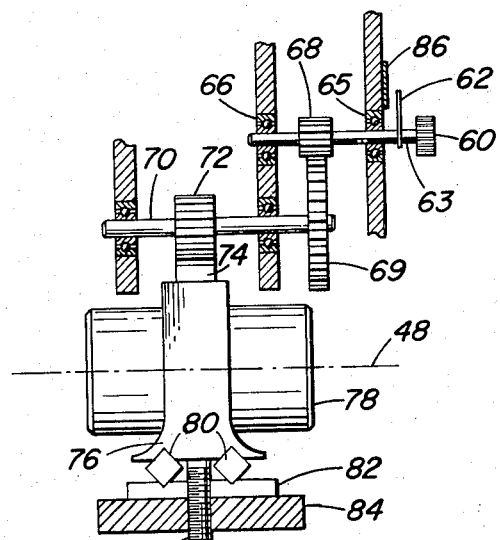
FIG. 2 schematically illustrates a mechanism for manipulating the structure to eliminate registration errors between the various optical systems.

FIG. 2 schematically represents a means of adjusting the position of the lenses of each of the optical reexposure systems, perpendicularly to their respective optical axis to compensate for registration errors within the overall imaging apparatus. A control knob 60 with a pointer 62 fitted to a common shaft 63 turns through bearings 65 and 66. This turns a pinion gear 68 fastened on the shaft which in turn rotates a gear 69. Centrally shafted to the gear is a shaft 70 held through suitable bearings and fitted concentrically with a pinion gear 72. The pinion gear moves a rack 74 held on a sleeve 76 encompassing the lens housing 78 holding the lens to be adjusted. The sleeve is notched at the bottom to house a way 80 supported rigidly from the optical frame (not shown). A pressure pad 82 maintains the lens locked in position when a nut 84 is tightened on the screw 100 which is integral with sleeve 76. By turning the knob 60, after loosening nut 84, the shaft 70 is rotated causing a linear movement of the rack 74 and the lens housing 78 intimately attached therewith. The amount of movement necessary to correct for registration errors within the system can be mathematically determined to be read directly on the calibrated template 86 by watching the movement of the pointer across the template.

Figure 3:
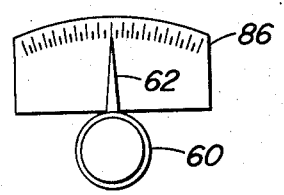
FIG. 3 is a front view of the registration adjustment indicator.

FIG. 3 is a front view of the template and pointer showing grading lines for alignment.

Figure 4:
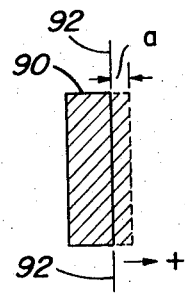

Each of the lenses is skewed on the principal ray to keep the images in focus at the imaging planes and to eliminate keystone distortion. Adjustment of the lens 38 perpendicularly to its optical axis slides the portion of the image tangentially to the imaging area 24, thus changing the arc length between sequential image projections. The resolution capability of the machine shown schematically in FIG. 1 is determined by the effects of slit registration errors, velocity errors of the images as they move and changes in magnification from one exposure system to another reexposure system. Some definitions would be helpful for discussing the mathematical derivations of these errors and applying the means to correct them or to bias them in favor of the system. A (+) loss of resolution is a displacement of the image relative to the photoreceptor or image plane in a positive direction as shown in FIG. 4. Here, 90 represents a perfect imaging area such as the area of a single bar of a bar resolution target.

Figure 5:
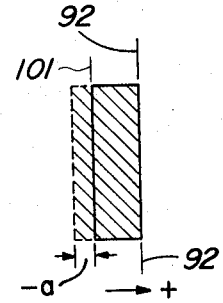

If there is a negative resolution error $(-a)$ the exposed resolution bar will appear as shown in FIG. 5. The total change in width of the exposed surface is the limiting factor on resolution capability of the above machine. Thus, the resolution is $R = \dfrac{1}{2a'}$ line pairs per unit length where $a'$ is the sum of the absolute values of the resolution errors $a$. That is to say that $a' = |(+a) \max.| + |(-a)| \min.$ .

Figure 6:
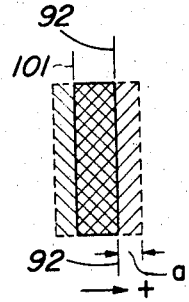

A photoreceptor that has been exposed to both positive and negative resolution errors will be enlarged as shown in FIG. 6.

Other terms that are used to determine the errors and means to correct them are $V_p$ which is the velocity of the photoreceptor (the cylinder 2) and is equal to $Rw$ where $R$ is the radius of the cylinder and $w$ is the angular velocity. $V_i$ is the image velocity and is equal to $M_1 V_0$ in the first slit and $M_2 V_0$ in the second slit where $M_1$ and $M_2$ are the respective magnification factors of the optical systems effecting slit 1 (imaging area 10) and slit 2 (imaging area 24). $V_0$ is the velocity of the object.

In the multiple slit scan system under consideration, some error occurs during slit scanning in slit 1 which is a result of image motion compensation errors only. In slit 2, two errors can occur. There is a registration error $a_r$ and an image compensation error $a_c$. The scan error in slit 2 is the sum of these two errors. Since the photoreceptor referenced from line 92—92 is reimaged in slit 2, the errors $a_2$ are superimposed upon the $a_1$ errors.

Mathematically the errors and achievable resolution capability may be stated as follows:

I. $$a_1 = \left(\dfrac{M_1 R_0}{R_p} - 1\right) S_1$$

II. $a_2 = a_r + a_c$
$$= 2R_p\left(\arcsin\left[\dfrac{C_o + (M_2+1)Y \cos\left(\dfrac{\theta_o}{2}\right)}{2R_p}\right] - \arcsin\left[\dfrac{C_o}{2R_o}\right]\right) + \left(\dfrac{M_2 R_o}{R_p} - 1\right) S_2$$

III. $$a' = |(+a) \max.| + |(-a) \min.|$$

IV. $$R = 1/2a'$$

where:

$a_1$ and $a_2$ are errors in slits 1 and 2 respectively, $c_0$ is the chord length between principal rays 45 and 46 at their intersection with drum 36, $Y$ is the distance along line 102 through which the lens is adjusted, $\theta_0$ is the angle on drum 36 established by chord $C_0$, and $S_2$ are the longitudinal widths of imaging areas 10 and 24.

The minimum possible motion compensation error $a_1$ is slit 1 is determined by the dependent variables and tolerances thereon in equation I, and for any machine $a_1$ can be positive or negative, but not controllable in sign without changing machine components.

Equation II, which specifies $a_2$ shows that $a_2$ can be varied from positive to negative by adjusting the value of $Y$, and means for accomplishing the adjustment is described previously in FIGS. 2 and 3.

The advantages of the invention can best be understood by considering that the images projected in slit 2 are superimposed over the image previously developed in slit 1.

As a result, if $a_1$ and $a_2$ are of opposite sign, the resolution will be $$\frac{1}{2(|a_1|+|a_2|)}$$

as shown by equations III and IV. If $a_1$ and $a_2$ are of the same sign then $R$ will be $$\frac{1}{2|(+a)_{max.}|}$$

or $$\frac{1}{2|(-a)_{min.}|}$$

whichever is smaller. This can better be seen by considering FIG. 6 showing the error resulting from a negative error in one slit and a positive error in the other slit.

FIG. 7 shows the same negative resolution error in slit 1 ($-a_1$) as is shown in FIGS. 5 and 6. The total error $a_2$ from slit 2 is made negative by setting a negative registration error $a_4$. The resolution $a_c$ in slit 2 is positive as in FIGS. 4 and 6. However, the positive $a_c$ error is superimposed over the previously imaged area, and the only effective error is $a_1$. Therefore, $$R = \frac{1}{2|a_1|}$$

The lines 92—92 and 101—101 have the same significance as before. 104—104 shows the shift in 92-92 in the second slit caused by ($-a_r$), and similarly 105—105 shows the shift of 101-101 for the same reason.

In multiple slit scan machines in which $Y$ distance through which the lens is adjusted) is zero the resolution achievable is approximately one-half that possible when a $Y$ adjustment is available. Conversely, machines without adjustability must be made more precise in optomechanical tolerances and therefore more expensive than machines with $Y$ adjustability in order to achieve equivalent resolution capability.

While this invention has been described with reference to the structures disclosed herein and while certain theories have been expressed, it is not confined to the details set forth; and this application is intended to cover such modifications or changes as may come within the purposes of the improvements and scope of the following claims.

What is claimed is:

1. Apparatus for reducing registration error in reexposure systems for superimposing object data on an image member including
    a movable imaging member;
    means to move the imaging member at a predetermined surface velocity;
    a first scanning optical projection system for projecting movable object data having a lens and a fixed conjugate position for projecting a flowing image on the imaging member;
    a second scanning optical projection system for projecting movable object data having a lens and a fixed conjugate position for projecting a flowing image on the imaging member;
    a second scanning optical projection system for projecting movable object data having a lens and a fixed conjugate position for projecting a flowing image on the imaging member such that it projects the same object data on the same portion of the imaging member as does the first optical projection system when the member is moved at the predetermined surface velocity, and
    means to adjust the position of the projection of at least one of the optical projection systems relative to the other for registering the projection of object data between the optical projection systems.

2. The apparatus of claim 1 wherein said means to adjust includes means to move a lens of one of said optical projection systems perpendicular to the optical axis of the system.

3. Apparatus as in claim 1 in which a lens in at least one of the projection systems is adjusted to effect a controllable change in flowing image at the imaging position thereof.

4. Apparatus as in claim 1 in which the motion and registration of the flowing images of all the imaging positions subsequent to the first is adjustably superposed in a preferred manner, over the imaging position of the first projection system.

5. The apparatus of claim 1 wherein said means to adjust the position of the projected image includes adjusting the projection systems to minimize $a'$ where $a'$ is the sum of the resolution and registration errors at the imaging positions.

6. In apparatus for reducing registration error in multiple reexposure systems having a movable imaging member, multiple scanning optical projection systems for projecting moving object data for superposed image reinforcement at fixed spaced positions interfaced by the moving imaging member, and a lens for each multiple scanning optical projection system, apparatus for reducing registration error between the reexposure systems including means to move at least one of the multiple lenses within its conjugate plane relative to the optical projection axis.

7. The apparatus of claim 6 wherein said means to move includes lens housing means and gear means cooperatively associated with said lens housing means for moving the lens perpendicular to the axis of the optical projection system.

8. The apparatus of claim 6 further including gauge means for determining error correction change and wherein said means to move at least one of the multiple lens is slaved to said gauge means.

* * * * *